United States Patent
Roks et al.

(10) Patent No.: US 6,654,059 B1
(45) Date of Patent: Nov. 25, 2003

(54) CHARGE COUPLED IMAGING DEVICE AND METHOD IN WHICH REDUNDANT LINES CAN BE DUMPED

(75) Inventors: Edwin Roks, Eindhoven (NL); Jan T. J. Bosiers, Eindhoven (NL); Alouisius W. M. Korthout, Eindhoven (NL); Peter Opmeer, Eindhoven (NL)

(73) Assignee: Dalsa Corporation, Waterloo (CA)

( * ) Notice: Subject to any disclaimer, the term of this patent is extended or adjusted under 35 U.S.C. 154(b) by 0 days.

(21) Appl. No.: 09/077,676

(22) PCT Filed: Oct. 2, 1997

(86) PCT No.: PCT/IB97/01201

§ 371 (c)(1),
(2), (4) Date: Jun. 3, 1998

(87) PCT Pub. No.: WO98/17051

PCT Pub. Date: Apr. 23, 1998

(30) Foreign Application Priority Data

Oct. 3, 1996 (EP) .............................................. 96202755
Jul. 15, 1997 (EP) .............................................. 97202189

(51) Int. Cl.$^7$ ................................................. H04N 3/14
(52) U.S. Cl. ......................... 348/317; 348/312; 348/322
(58) Field of Search ..................... 250/208.1; 257/222, 257/223, 229, 230, 231, 232, 233; 348/207, 220, 221, 229, 230, 248, 249, 250, 296–299, 308–312, 314–317, 320–324; H04N 5/235, 3/14

(56) References Cited

U.S. PATENT DOCUMENTS

| | | | | |
|---|---|---|---|---|
| 4,499,496 A | * | 2/1985 | Tanaka | 348/317 |
| 5,182,623 A | * | 1/1993 | Hynecek | 257/230 |
| 5,276,341 A | * | 1/1994 | Lee | 257/223 |
| 5,280,186 A | * | 1/1994 | Lee | 257/232 |
| 5,286,990 A | * | 2/1994 | Hynecek | 257/247 |
| 5,317,408 A | * | 5/1994 | Hirota | 348/315 |
| 5,376,967 A | * | 12/1994 | Sakota | 348/311 |
| 5,440,343 A | * | 8/1995 | Parulski | 348/316 |
| 5,804,843 A | * | 9/1998 | Furumiya | 257/222 |
| 5,828,406 A | * | 10/1998 | Parulski | 348/220 |
| 5,896,172 A | * | 4/1999 | Korthout | 348/248 |
| 6,040,859 A | * | 3/2000 | Takahashi | 348/243 |

FOREIGN PATENT DOCUMENTS

EP    0720388 A2    7/1996    ............ H04N/9/04

OTHER PUBLICATIONS

"A 2/3–in 1187(H) X 581(V) S–VHS Compatible Frame–Transfer CCD for ESP and Movide Mode", by Jan T. Bosiers et al., IEEE Transactions on Electron Devices, vol. 38, No. 38, No. 5, May 1991, pp. 1059–1068.

* cited by examiner

*Primary Examiner*—Ngoc-Yen Vu
(74) *Attorney, Agent, or Firm*—Dorsey & Whitney LLP

(57) ABSTRACT

A charge coupled imaging device includes a matrix of elements for converting an image projected onto the matrix into a frame of charge packets, along with a system of vertical charge transport channels (3) and a horizontal read-out register (C). A structure is provided for dumping unnecessary lines into a removal region in a certain operating mode. These lines are dumped at the transition between the imaging section and the memory section. The imaging device includes an imaging section (A) and a separate memory section (B) as well as a removal region (12) situated below the matrix as an anti-blooming provision. Unnecessary lines may be dumped, for example, into the substrate in that the transport in the imaging section is continued during frame transport while at the same time the transport in the memory section is stopped. To prevent or at least reduce aliasing, the charge pattern in the imaging section is displaced while an image is being captured such that, within a group of k lines of which only one line will be sampled, the remaining, unused k−1 lines being dumped, the selected line will contain charge originating from the non-selected lines.

18 Claims, 5 Drawing Sheets

CHARGE COUPLED IMAGING DEVICE AND METHOD IN WHICH REDUNDANT LINES CAN BE DUMPED

BACKGROUND OF THE INVENTION

This invention relates to a charge coupled imaging device comprising a semiconductor body having a surface with a matrix of elements for converting a radiation image into charge packets, arranged in a grid of lines and columns, and with a system of charge transport channels with which said charge packets are transported to a read-out register in a direction parallel to the columns under the control of clock voltages applied to clock electrodes, by which register the charge packets are transported line by line in a direction parallel to the lines of the grid to a read-out member, an electrode being present which extends transversely across the entire width of the matrix in the line direction and to which a voltage can be applied for dumping one or several lines, via a removal region, from between two lines which are read out via the read-out register. An electrode is a solid conductor by which a current can pass to or from another solid conductor.

Such an imaging device is known inter alia from European Patent Application EP 0 720 388 laid open to public inspection. An imaging device is described therein which can be operated in two different modes, i.e. in the "still image mode" and in the "motion preview mode". In the first mode, all lines of the grid are read out and subsequently subjected to further signal processing so as to obtain the desired high resolution. In the second mode, which is used for displaying the captured image on an LCD of the viewfinder of the camera, only a limited number of lines is necessary, and the redundant lines present between the former lines are dumped into a removal region instead of being read out. The imaging device is of the interline type, with photodiodes arranged in a pattern of rows and columns and with charge transport channels between the columns of photodiodes. The charge packets formed in the photodiodes during an integration period are transported to a horizontal read-out register through these charge transport channels (which are screened against incident radiation). An FDG (fast dump gate) is provided between the vertical charge transport channels and the horizontal read-out register, by means of which FDG lines can be dumped in the "motion preview mode". A disadvantage of this device is that a separate electrode and a separate voltage source for controlling the FDG are necessary for dumping the redundant lines.

SUMMARY OF THE INVENTION

The invention accordingly has for its object inter alia to provide a charge coupled imaging device in which redundant lines can be dumped without having the disadvantages described above.

Dumping of redundant lines may offer advantages also in types of imaging devices other than the imaging device described above. Thus, for example, the article "A ⅔-in 1187 (H)×581(V) S-VHS-Compatible Frame-Transfer CCD for ESP and Movie mode" by Bosiers et al., published in IEEE Transactions on Electron Devices, Vol. 38, No.5, May 1991, pp. 1059/1068, describes an imaging device which comprises besides the photosensitive imaging section also a memory section adjoining the former and masked against incident radiation. The number of lines that can be stored in the memory section is 295, i.e. half the number of lines in the imaging section, which is 581. In the "movie mode", the lines in the imaging section are added together in pairs to render it possible to store all charge generated in the imaging section in the memory section, so that the total number of lines in the imaging section is reduced by a factor 2 to fit the storage capacity of the memory section. Joining together of the lines achieves a high sensitivity. Often, however, an increase in the MTF (improved resolution) is considered more important, in which case it would be preferable to transport the lines from the imaging section alternately to the memory section and to the dump. The invention accordingly has for its object also to provide an imaging device of the frame transfer type which is provided with an imaging section and with a memory section smaller than the imaging section and which also offers the possibility of dumping redundant lines.

These and other objects, whether or not in combination with one another, are achieved in a charge coupled imaging device according to the invention which is characterized in that, the imaging device being built up from a photosensitive imaging section and a memory section screened against incident radiation and comprising a number of charge transport channels which are situated next to one another, which extend in the column direction, and which merge into the charge transport channels of the imaging section, said electrode for dumping the lines which are not used is situated at the transition between the imaging section and the memory section. Redundant lines are dumped at the transition between the imaging section and the memory section in an imaging device according to the invention. The entire frame of charge packets can be transported in the usual manner with 1-, 2-, 3-, or 4-phase clock voltages in the imaging section, while only those lines which are necessary for further processing are stored in the memory section.

Important advantages are obtained when the electrode with which lines are dumped is formed by a separate electrode which is controlled independently of the m-phase clock electrodes. A preferred embodiment which has the advantage that no separate electrode is necessary is characterized in that said electrode with which lines can be dumped comprises at least one clock electrode of the imaging section which is connected to other clock electrodes of the imaging section via clock lines. A further embodiment is characterized in that the charge transport channels of the imaging section and the memory section comprise electrodes which are connected to clock voltage means with which voltages can be applied whereby transport of charge packets takes place in the imaging section, while at the same time no transport of charge packets takes place in the memory section, and charge packets supplied via the imaging section are blocked by a potential barrier at the area of the memory section and are drained off through the removal region.

An important preferred embodiment, which, in a simple manner, prevents charge from lines to be dumped from partly joining charge packets of other lines during the process of dumping of lines, is characterized in that the removal region is provided with means for applying a voltage to the removal region for the purpose of dumping of charge packets, whereby at least locally a reduction of the potential barrier between the removal region and the charge transport channel is obtained as compared with the potential barrier obtaining during a preceding integration period.

The invention also relates to a method of operating a charge coupled imaging device comprising a semiconductor body which is provided at a surface with a matrix for converting a radiation image into charge packets, arranged in a grid of lines and columns, and with a system of charge transport channels with which said charge packets are transported in a direction parallel to the columns to a read-out register under the control of clock voltages applied to clock electrodes, which read-out register transports the charge packets line by line to a read-out member in a direction parallel to the lines of the grid, an electrode being present which extends in the line direction transversely across the width of the matrix and to which a voltage can be applied for dumping one or several lines via a removal region between two lines which are read out through the read-out register. Such a method according to the invention is characterized in that, an imaging device being used built up from a photosensitive imaging section and a memory section screened against incident radiation and comprising a number of charge transport channels which lie next to one another, which extend in the column direction, and which merge into the charge transport channels of the imaging section, one or several clock electrodes of the charge transport channels is/are used so as to form said electrode for dumping of lines which are not used, which electrode or electrodes is/are situated at the transition between the imaging section and the memory section.

A preferred method in which aliasing is suppressed at least partly, is characterized in that only one line out of every group of k lines formed in an integration period is stored in the memory section, the lines being shifted during the integration period such that said one line also contains electric charge generated at the areas of the other lines of said group of k lines.

BRIEF DESCRIPTION OF THE DRAWING

These and other aspects of the invention will be explained in more detail with reference to an embodiment. In the drawing.

DESCRIPTION OF THE PREFERRED EMBODIMENTS

Figure 1:
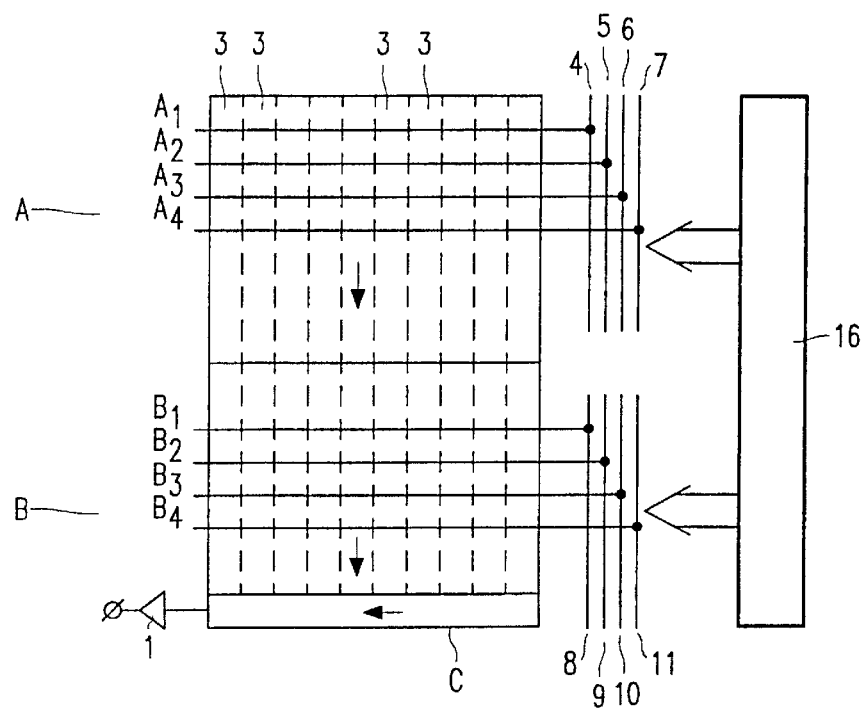
FIG. 1 is a diagram of a charge coupled imaging device according to the invention.

An imaging device of the FT (Frame Transfer) type is described as an example of a charge coupled imaging device according to the invention. The invention, however, is not limited thereto. The device may accordingly also be of an alternative type, for example of the interline type provided with an additional frame memory. FT devices are generally known per se and often described in the literature. In the following description, therefore, elements will only be explained in more detail if this is necessary for understanding the invention. The device comprises, as shown in FIG. 1, a photosensitive imaging section A and an adjoining matrix B which forms a memory screened against incident radiation. An image is converted into a grid pattern of charge packets in the imaging section, arranged in lines (horizontal) and columns (vertical). Lines of charge packets generated in the imaging section A in the integration period can be transported into the memory B in a comparatively short time. The memory adjoins at its lower side a horizontal read-out register C, which in this example is depicted as a single register but which may alternatively comprise two or more parallel registers, as is generally known. The information in the memory B is transported into the register C line by line during read-out. The charge packets of one line are transported to the output of the register C and read out there by the read-out member 1 packet by packet.

The device is provided at the surface of a semiconductor body 2 made of silicon and comprises a number of charge transport channels 3 situated next to one another and mutually separated by channel bounding zones which are indicated with broken lines in FIG. 1. The channels 3 extend in vertical direction, i.e. parallel to the column direction, and parallel to the surface. The charge storage and the charge transport are controlled by means of clock voltages applied to electrodes which in this example extend transversely to the charge transport direction across the imaging section A and the memory section B. Only four electrodes of the imaging section and four electrodes of the memory section are shown in FIG. 1 so as not to make the drawing unnecessarily complicated, while the charge coupled imaging device is a 4-phase system by way of example. In actual fact, of course, the surface is covered with electrodes over the entire length of the charge transport channels. The electrodes in the imaging section are connected to clock lines 4, 5, 6 and 7 through which the clock voltages are supplied. The electrodes in the imaging section connected to clock lines 4, 5, 6 and 7 have been given reference numerals A1, A2, A3 and A4, respectively. Similarly, the clock electrodes B1, B2, B3 and B4 of the memory section are connected to clock lines 8 9, 10 and 11, respectively.

Figure 2:
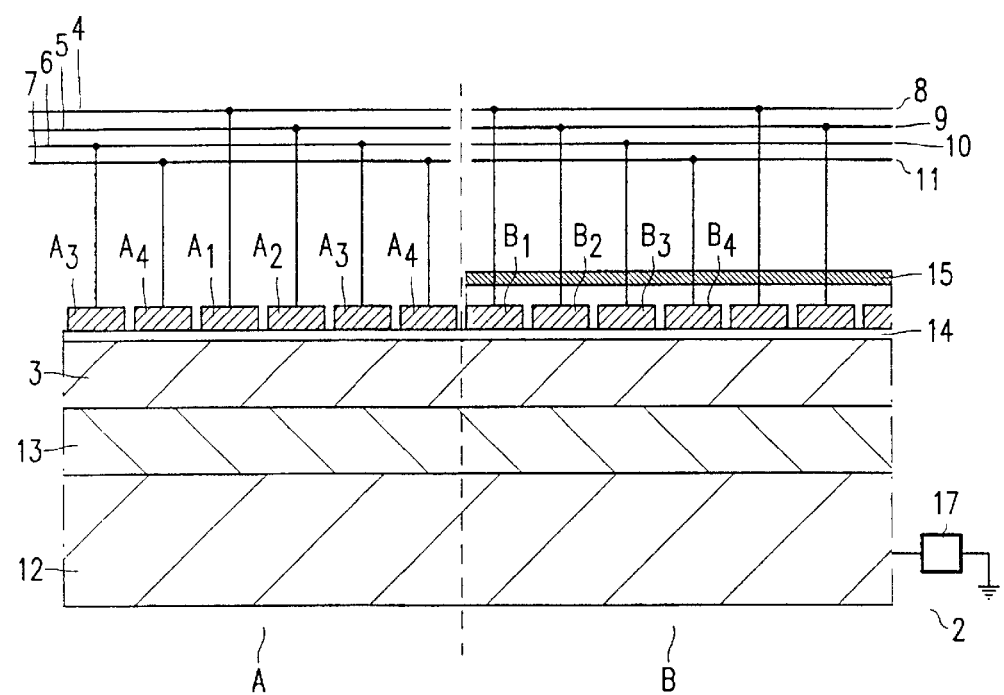
FIG. 2 is a cross-section of this device.
Figure 3:
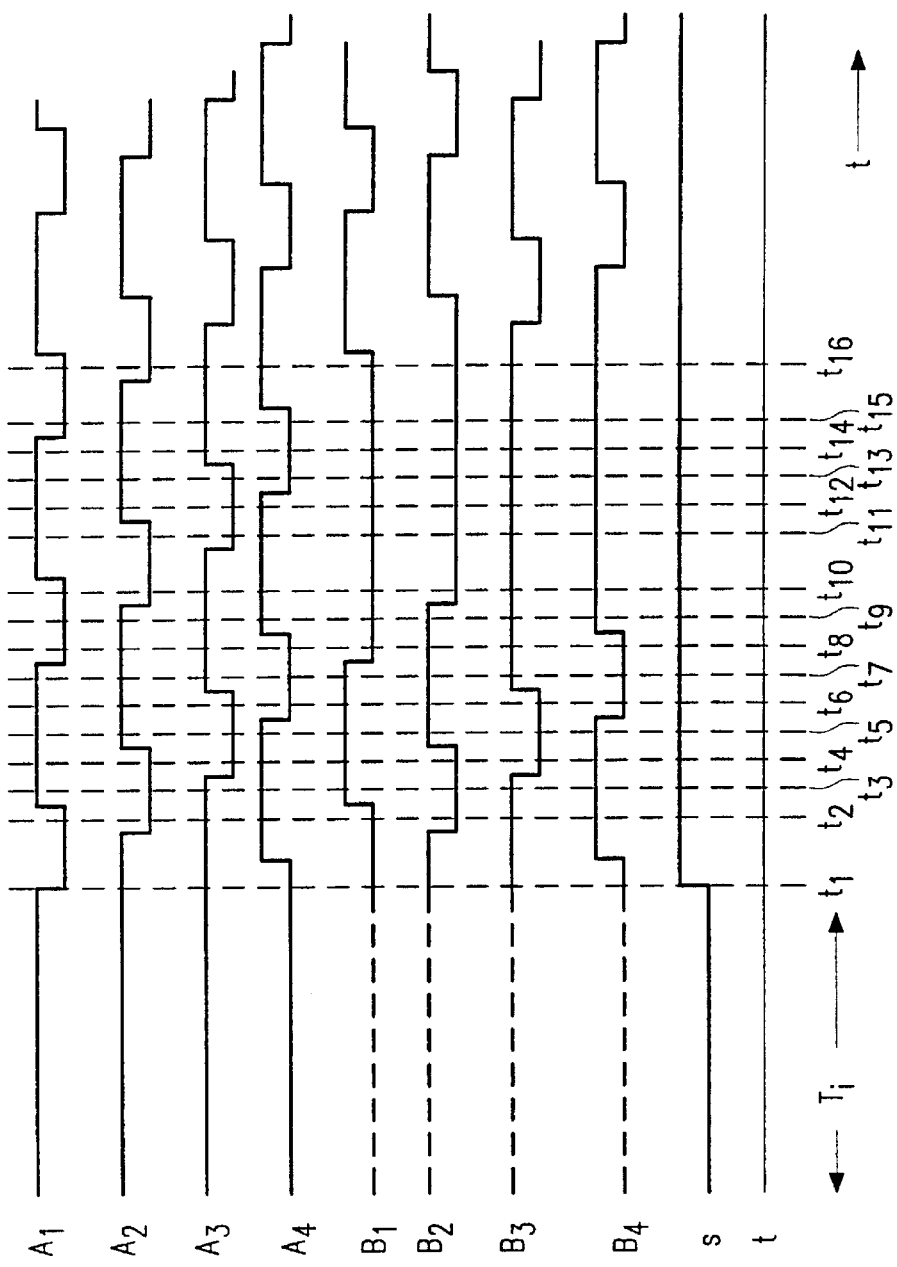
FIG. 3 is a diagram representing clock voltages which are applied during operation of this imaging device.
Figure 4:
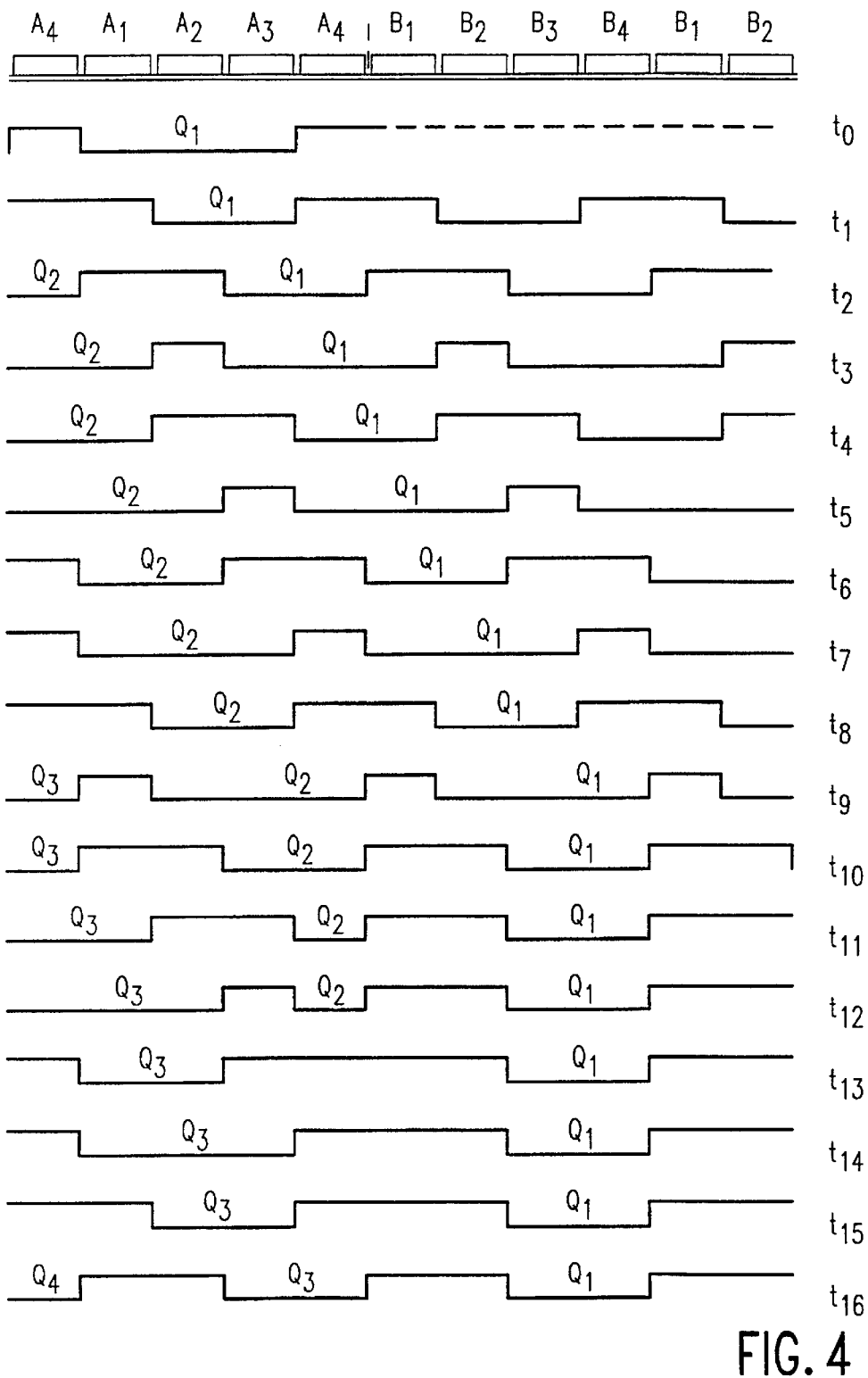
FIG. 4 is a diagram of potential profiles which are present in the semiconductor doctor body at these clock voltages in a direction parallel to the surface.
Figure 5A:
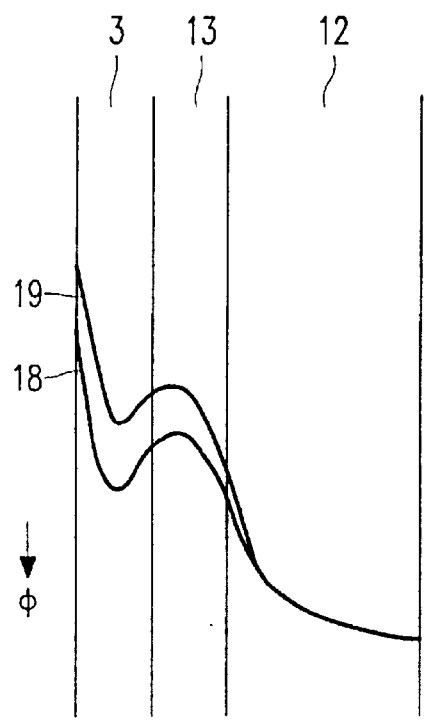
FIGS. 5a and 5b are diagrams of potential profiles which occur in a direction perpendicular to the surface at these clock voltages.

FIG. 2 is a cross-section of the device along a transport channel 3, part of the imaging section A and part of the memory section B being shown in the drawing. In this example, where the device is of the n-channel type, the channels 3 are formed by an n-type surface layer with a thickness and doping concentration as are usual for charge coupled devices of the buried channel type. A region 12, also of the n-type and formed by the substrate here, is situated below the channels 3 and forms a drain or removal region for excess electric charge. Between the substrate 12 and the channels 3 lies a p-type region 13 which has a thickness and doping concentration such that a potential barrier of a suitable level can be formed between the channels 3 and the substrate 12. Such a triple layer structure is often used nowadays in imaging devices with vertical anti-blooming, in which the substrate is used for draining off excess charge in the case of overexposure. The electrodes Ai of the imaging section and the electrodes Bi of the memory are electrically insulated from the surface of the semiconductor body by a dielectric layer 14 made of, for example, silicon oxide or a double layer of silicon oxide and silicon nitride. The electrodes are manufactured from a transparent material such as doped polycrystalline silicon. A light screen 15 is provided above the electrodes in the memory section to prevent radiation from generating charge in the memory. This light screen may be formed, for example, by an aluminum layer which is electrically insulated from the electrodes. The electrodes Ai and Bi are controlled by a clock driver circuit 16 which is diagrammatically depicted in FIG. 1. The potential of the removal region 12 (substrate) is set by means of a voltage source 17 (FIG. 2). FIG. 3 shows the clock voltages applied to the electrodes A1–A4, B1–B4 and the voltage S applied to the region 12 as a function of time t. The clock voltages have been identified with the indications Ai and Bi of the phase electrodes for the sake of convenience. The voltages Ai and Bi vary between a low level, for example 0 V, and a high level, for example 10 V. The substrate voltage S has a low level of, for example, 20 V and a high level of, for example, 25 V. FIG. 4 shows the accompanying potential profiles along a portion of a charge transport channel on either side of the transition between the imaging section A and the memory section B. As usual, the positive potential is plotted in downward direction in this drawing. During an integration period Ti, the electrodes A1, A2 and A3 are set for a high voltage level (for example 10 V) and the electrodes A4 for a low level. A pixel is formed by the electrodes A1, A2 and A3 and half the adjoining electrodes A4. The charge (i.e. electrons generated through absorption of locally incident radiation) is integrated in the potential well below the electrodes A1, A2 and A3. The charge packets are mutually separated by the potential barriers below the electrodes A4, cf. FIG. 4, $t_0$. The voltages are chosen such that the potential barrier below the electrodes A4 is higher than the potential barrier in the p-type layer 13 between the layer 3 and the substrate 12, so that excess electrons will flow into the substrate 12 and not into adjoining pixels in the case of overexposure. FIG. 5a plots the potential $\Phi$ (in downward direction) measured in a direction transverse to the surface. Curve 18 shows the potential below the integrating electrodes A1 to A3. Curve 19 shows the potential below the blocking electrodes A4. It is noted that also the curve 19 exhibits a minimum in the n-type layer 3. This is favourable for the sensitivity because electrons generated in the layer 3 below the electrodes A4 are not drained off into the substrate but will flow to one of the adjoining potential wells below the electrodes A1 to A3. The electrodes B1 to B4 may be at a fixed potential when the memory matrix is empty. If a frame is stored in the memory, this frame can be transported to the horizontal register C in a usual manner so as to be read out line by line through this register. In FIG. 3, accordingly, the potentials of the electrodes B1 to B4 during the integration period $T_i$ are indicated with broken lines.

Figure 5B:
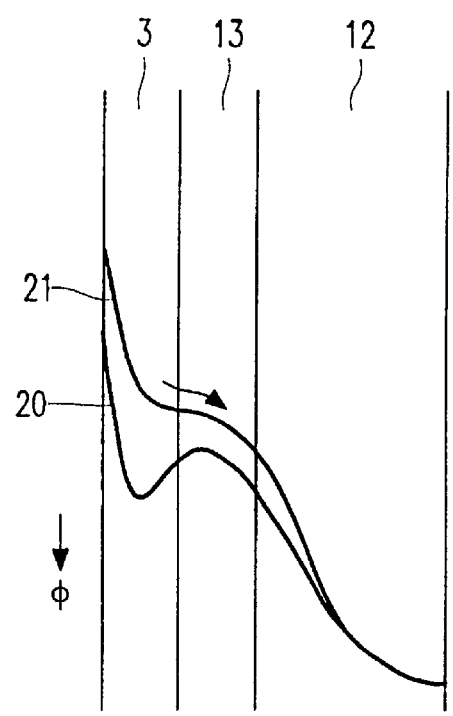

The integration period ends at moment $t_1$, and the transport period starts in which the frame of charge packets formed in the imaging section is (partly) transported into the memory section. Four-phase clock voltages are applied to the electrodes A1 to A4, as well as to the electrodes B1 to B4. The clocks of the electrodes B are in phase with those of the electrodes A in the sense that, as is visible in FIG. 3, the clock voltage B1 is in phase with the clock voltage A1, B2 with A2, etc. An additional positive voltage S is simultaneously applied to the substrate 12. The significance of this will be explained in a later stage. At moment $t_1$, A1 switches to the low voltage level, so that the charge packets Q initially stored below three electrodes are now stored below two electrodes, i.e. the electrodes A2 and A3, as shown in FIG. 4, $t_1$, relating to the packet $Q_1$, which is representative of the bottom line in the imaging section. At $t_3$, B1 is also high so that $Q_1$ is transported into the memory section. $Q_1$ has entirely been transferred into the memory B at moment $t_6$. The transport is continued until $Q_1$ lies stored below the electrodes B3 and B4, see FIG. 4, at $t_{10}$. The clocks in the memory section are then stopped, so that the charge remains stored below B3 and B4, while a potential barrier has been formed below B1 and B2. The transport is continued in the imaging section, so that the next line, represented by the charge packet $Q_2$ in FIG. 4, is transported farther to the right. At $t_{10}$, $Q_2$ is stored below A3 and A4 and is bounded on the right-hand side by the potential barrier below B1. At the moments $t_{11}$ and $t_{12}$, the charge packet $Q_2$ has been compressed into the storage space below the electrode A4. At $t_{13}$, A4 is at the low voltage level, as are the adjoining electrodes A3 and B1. The charge packet $Q_2$ cannot be stored below an electrode anymore now, but is drained off through the substrate 12 (charge reset). To illustrate this, FIG. 5b shows potential profiles 20 and 21 below an electrode at the positive voltage and at the low voltage, respectively. The curve 20 shows a potential minimum in which a charge packet can be stored. The curve 21, unlike the curve 19 in FIG. 5a, shows no minimum anymore owing to the higher substrate voltage, so that charge stored below this electrode flows to the substrate 12 in the direction indicated by the arrow and can be drained off through the substrate. The charge reset condition is present below the electrodes A3, A4, B1 and B2, i.e. below four electrodes, so that the risk of charge which should be dumped flowing to adjoining packets is practically entirely avoided. At the same time, the other charge packets in one and the same line with $Q_2$ are drained off through the substrate. The charge transport in the imaging section is continued after dumping of this line, FIGS. 3 and 4, $t_{14}$ and $t_{15}$. At $t_{16}$, the next line is in the imaging section, i.e. line $Q_3$, stored below the electrodes A3 and A4. The situation in the imaging section A is symmetrical with the situation in the memory section again then. Assuming that the line $Q_3$ is to be stored in the memory, the charge transport in the memory section is continued in that the four-phase clock voltages applied to the electrodes B1 to B4 are varied in synchronity with the clock voltages A1 to A4 in the imaging section.

It is accordingly possible in this manner to dump lines before they are stored in the memory. In the example described here, this is achieved without additional electrodes, simply by stopping the transport in the memory section while the transport in the imaging section is continued, which is possible thanks to the fact that the electrodes in the imaging section can be controlled independently of the electrodes of the memory. Major advantages can obviously also be obtained in embodiments of an imaging device according to the invention in which a separate dumping electrode configuration is present at the transition between the imaging section and the memory section.

To ensure that no electric charge will enter the memory section during dumping, the low voltage level of the electrodes B1 to B4 may be made particularly low (or negative) during dumping, at least lower than the low voltage level of the electrodes A1 to A4, whereby the potential barrier between the imaging section and the memory section is additionally increased.

In the embodiment described here, an additional positive voltage is applied to the substrate 12 during the frame transport for the purpose of line dumping. This additional voltage may alternatively be applied during the integration period, if so desired, which means that a fixed voltage can be applied to the substrate. Since the electrons generated below the barrier electrodes are drained off to the substrate during the integration period, the sensitivity in this mode of operation is lower than in the mode of operation described further above.

Figure 6:
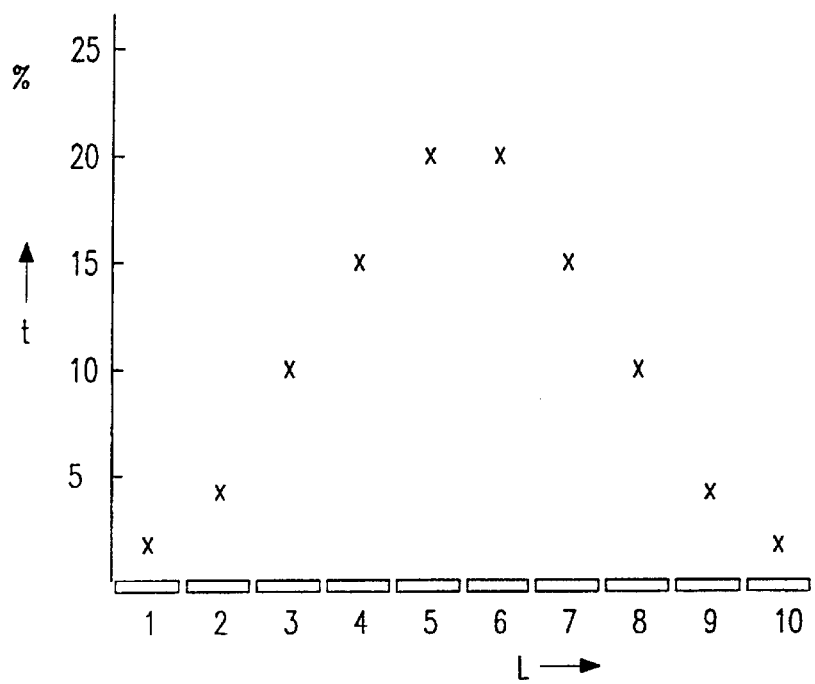
FIG. 6 is a diagram representing displacements of the lines during the integration period in a black-and-white imager according to the invention.

The embodiment described here relates to a CCD imager with subsampling of 1 in k lines, i.e. only one line out of every k lines is stored as video information in the memory, while the other k−1 lines are dumped. This operation increases the risk of aliasing, which phenomenon is known from the literature. A method of preventing this is to carry out a low-pass filtering before the subsampling operation such that the bandwidth is limited to half the sampling frequency after the subsampling operation. In an imager of the type described, where the image is caught in the charge transport channels and is converted into electric charge, the filtering operation may be carried out electronically during the integration period. This can be achieved in that the lines are moved to and fro during the integration period such that that line within a group of k lines which will eventually be the only one to be used will contain an electric charge which corresponds to the lines which are not used. This is diagrammatically depicted in FIG. 6 for a black-and-white imager with k being equal to 10. The line number L in a group of 10 lines is plotted on the horizontal axis. The vertical axis shows the relative dwell time t of the line to be sampled in per cents, in this example of line no. 5. The other lines, so the lines 1 to 4 and 6 to 10, are not used and are dumped in the manner described above. Line no. 5 is shifted over the entire group of 10 lines during the integration period. Obviously, the other lines are also shifted simultaneously, partly within the group, partly outside the group. As the drawing shows, the dwell time of the selected line 5 decreases in proportion as it gets farther removed from the center of the group. The relative dwell time of the line to be selected is 20% for the lines numbered 5 and 6, 15% for the lines numbered 4 and 7, 10% for the lines numbered 3 and 8, 4% for the lines numberd 2 and 9, and 1% for the lines numberd 1 and 10 in the example shown here.

Figure 7:
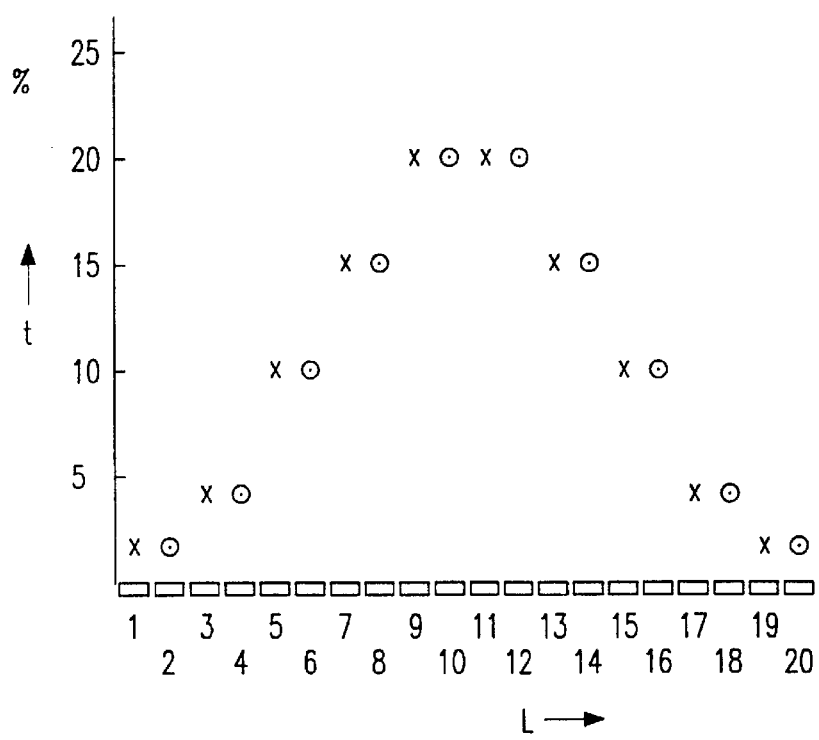
FIG. 7 is a diagram representing displacements of the lines during the integration period in a color imager according to the invention.

The same method may be used for a color imager with a vertical stripe filter. In a color imager with a mosaic color filter, however, the period in vertical direction should be taken into account. This is diagrammatically shown in FIG. 7 for the case in which a color imager has a period of 2 lines in vertical direction (and a period of 2 pixels in horizontal direction). An example of this is a filter having the composition:

RGRGRGRG
GBGBGBGB
RGRGRGRG
GBGBGBGB where R, G, and B stand for red, green, and blue, respectively. To obtain the color information, two lines, for example the lines 9 and 10, are now selected out of every group of 20 lines. The information from the other lines is not used. During the integration period the line no. 9 (indicated with crosses in FIG. 7) dwells temporarily on the line numbers 9 and 11 (20%), 7 and 13 (15%), 5 and 15 (10%), 3 and 17 (4%), and 1 and 19 (1%). Similarly, the line 10 (indicated with open dots in FIG. 7) collects charge from the lines in the group which have even line numbers.

It will be obvious that the invention is not limited to the embodiment described here but that many more variations are possible to those skilled in the art within the scope of the invention. Thus more lines in succession may be dumped into the substrate instead of a single line $Q_2$, which is dumped between two other lines which are stored in the memory for further processing. The invention may also be advantageously applied to other types of imaging devices, such as imaging devices of the interline type, provided with an additional frame memory. In the embodiment described here, the conductivity types may be interchanged, so that a device with a p-type channel is obtained. The removal region may alternatively lie next to instead of below the photosensitive elements, as is usual in imaging devices with lateral anti-blooming.

What is claimed is:
1. A charge coupled imaging device comprising: a semiconductor body having a surface with a matrix of elements for converting a radiation image into charge packets, arranged in a grid of lines and columns, and a system of charge transport channels with which said charge packets are transported to a read-out register in a direction parallel to the columns under the control of clock voltages applied to clock electrodes of the matrix, the charge packets being transported line by line by the read-out register in a direction parallel to the lines of the grid to a read-out member, an electrode being present which extends transversely across the entire width of the matrix in the line direction and to which a voltage is applied for dumping one or several lines, via a removal region of the imaging device, from between two lines which are read out via the read-out register, wherein the imaging device includes a photosensitive imaging section and a memory section screened against incident radiation and comprising a number of charge transport channels which are situated next to one another, extend in the column direction and merge into the charge transport channels of the imaging section, said electrode for dumping the lines which are not used being situated at a transition between the imaging section and the memory section, and means for applying a voltage to the removal region for the purpose of dumping of charge packets, whereby at least locally a potential barrier between the removal region and the charge transport channels is reduced as compared with a potential barrier between the removal region and the charge transport channels during a preceding integration period.

2. A charge coupled imaging device as claimed in claim 1, characterized in that the number of lines in the memory section is smaller than the number of lines in the imaging section.

3. A charge coupled imaging device as claimed in claim 1 wherein a group of k lines is formed in the imaging section during an integration period, and
   means for controlling the supply of clock voltages to the clock electrodes so that only one line out of every group of k lines formed in the integration period is stored in the memory section, and wherein the lines are controlled during the integration period such that said one line contains electric charge generated at the areas of all lines of the group of k lines.

4. A charge coupled imaging device as claimed in claim 1 characterized in that the charge transport channels of the imaging section and the memory section comprise electrodes which are connected to clock voltage means which supply clock voltages in a manner whereby transport of charge packets takes place in the imaging section while at the same time no transport of charge packets takes place in the memory section, and charge packets supplied via the imaging section are blocked by a potential barrier at the area of the memory section and are drained off through the removal region.

5. A charge coupled imaging device as claimed in claim 1, characterized in that said electrode with which lines can be dumped comprises at least one clock electrode of the imaging section which is connected to other clock electrodes of the imaging section via clock lines.

6. A charge coupled imaging device as claimed in claim 5, characterized in that the charge transport channels of the imaging section and the memory section comprise electrodes which are connected to clock voltage means which supply clock voltages in a manner whereby transport of charge packets takes place in the imaging section while at the same time no transport of charge packets takes place in the memory section, and charge packets supplied via the imaging section are blocked by a potential barrier at the area of the memory section and are drained off through the removal region.

7. A method of operating a charge coupled imaging device of the type as claimed in claim 5, the method comprising:

transporting said charge packets to the read-out register in a direction parallel to the columns under the control of clock voltages applied to the clock electrodes, applying a clock voltage to said at least one clock electrode for dumping, via the removal region, one or several lines of charge packets present between two lines of charge packets to be read out via the read-out register, and applying a modified voltage to the clock electrode of the imaging section located at the transition between the imaging section and the memory section, such that at least locally, the potential barrier between the removal region and the charge transport channels of the imaging device is reduced as compared with said potential barrier during a preceding integration period.

8. A method as claimed in claim 7, which further comprises: storing in the memory section only one line out of every group of k lines formed in an integration period, and controlling the lines during the integration period such that said one line also contains electric charge generated at the areas of the other lines of said group of k lines.

9. A method as claimed in claim 7, further comprising: storing in the memory section only one line out of every group of k lines formed in an integration period, and controlling the lines during the integration period such that said one line contains electric charge generated at the areas of all lines of the group of k lines.

10. A charge coupled imaging device comprising: a semiconductor body having a surface with a matrix of elements for converting a radiation image into charge packets, said matrix of elements arranged in a grid of lines and columns, and a system of charge transport channels with which said charge packets are transported to a read-out register in a direction parallel to the columns under the control of clock voltages applied to clock electrodes of the matrix, the semiconductor body having a sandwich arrangement of an n-material substrate, a layer of p-material and a layer of n-material with the layer of n-material being closest to the surface with the matrix of elements, the substrate being operative as a removal region for lines of redundant charge packets, a photosensitive imaging section and a memory section screened against incident radiation and comprising a number of charge transport channels which are situated next to one another, extend in the column direction and merge into the charge transport channels of the imaging section, wherein one said clock electrode, situated at a transition between the imaging section and the memory section and extending transversely across the entire width of the matrix in the line direction, is operative to dump one or more lines of charge packets from the imaging section via the substrate removal region upon receipt of a particular clock voltage at said one clock electrode.

11. A charge coupled imaging device as claimed in claim 10 further comprising:

means for controlling the electrodes of the imaging section independently of the electrodes of the memory section such that redundant lines in the imaging section can be dumped bypassing storage in the memory section.

12. A charge coupled imaging device as claimed in claim 10 wherein the memory section contains fewer lines than the imaging section.

13. A charge coupled imaging device as claimed in claim 10 wherein a group of k lines is formed in the imaging section during an integration period, and means for controlling the supply of clock voltages to the clock electrodes so that only one line out of every group of k lines formed in the integration period is stored in the memory section, and wherein the lines are controlled during the integration period such that said one line also contains electric charge generated at the areas of the other lines of said group of k lines.

14. A charge coupled imaging device as claimed in claim 10 wherein the clock voltages are applied to the clock electrodes of the imaging section and the memory section such that transport of charge packets takes place in the imaging section while at the same time no transport of charge packets takes place in the memory section, and charge packets supplied by the imaging section are blocked by a potential barrier at the area of the memory section and are drained off through the removal region.

15. A charge coupled imaging device as claimed in claim 10 further comprising:

means for applying a voltage to the removal region for the dumping of charge packets, whereby a potential barrier between the removal region and the charge transport channel is reduced as compared with said potential barrier during a preceding integration period.

16. A charge coupled imaging device as claimed in claim 10 further comprising:

means for applying a modified voltage to said electrode so that, at least locally, a potential barrier between the removal region and the charge transport channels is reduced as compared with said potential barrier during a preceding integration period.

17. A charge coupled imaging device comprising: a semiconductor body having a surface with a matrix of elements for converting a radiation image into charge packets, said matrix of elements arranged in a grid of lines and columns, and a system of charge transport channels with which said charge packets are transported to a read-out register in a direction parallel to the columns under the control of clock voltages applied to clock electrodes of the matrix, the semiconductor body having a sandwich arrangement of an n-material substrate, a layer of p-material and a layer of n-material with the layer of n-material being closest to the surface with the matrix of elements, the substrate being operative as a removal region for lines of redundant charge packets, a photosensitive imaging section and a memory section screened against incident radiation and comprising a number of charge transport channels which are situated next to one another, extend in the column direction and merge into the charge transport channels of the imaging section, wherein one said clock electrode, situated at a transition between the imaging section and the memory section, is operative to dump one or more lines of charge packets from the imaging section via the substrate removal region upon receipt of a particular clock voltage at said one clock electrode, and during a line dumping operation, adjusting the voltage level of at least some clock electrodes of the memory section relative to the voltage level of at least some clock electrodes of the imaging section such that a voltage barrier between the electrodes of the imaging section and those of the memory section is increased to a level so as to insure that no electric charge will enter the memory section during the line dumping operation.

18. A charge coupled imaging device comprising: a semiconductor body having a surface with a matrix of elements for converting a radiation image into charge packets, arranged in a grid of lines and columns, and a system of charge transport channels with which said charge packets are transported to a read-out register in a direction parallel to the columns under the control of clock voltages applied to clock electrodes of the matrix, the charge packets being transported line by line by the read-out register in a direction parallel to the lines of the grid to a read-out member, an electrode being present which extends transversely across the entire width of the matrix in the line direction and to which a voltage is applied for dumping one or several lines, via a removal region of the imaging device, from between two lines which are read out via the read-out register, wherein the imaging device includes a photosensitive imaging section and a memory section screened against incident radiation and comprising a number of charge transport channels which are situated next to one another, extend in the column direction and merge into the charge transport channels of the imaging section, said electrode for dumping the lines which are not used being situated at a transition between the imaging section and the memory section, wherein a group of k lines is formed in the imaging section during an integration period, and means for controlling the supply of clock voltages to the clock electrodes so that only one line out of every group of k lines formed in the integration period is stored in the memory section, and wherein the lines are controlled during the integration period such that said one line also contains electric charge generated at the areas of the other lines of said group of k lines.

* * * * *